Figure 1:
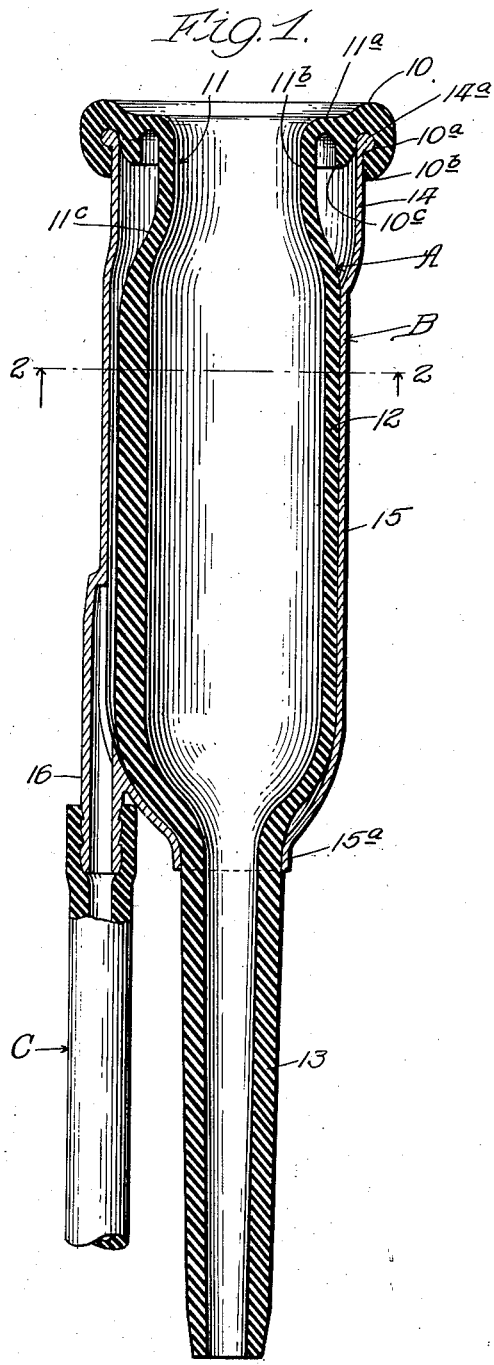

March 28, 1950 H. B. BABSON ET AL 2,502,362
MILKER INFLATION AND SHELL
Filed June 18, 1945 2 Sheets-Sheet 1

Inventors:
Henry B. Babson,
Chester A. Thomas,
By Clinton, Wiley, Schroeder,
Merriam & Hofgren, Attys.

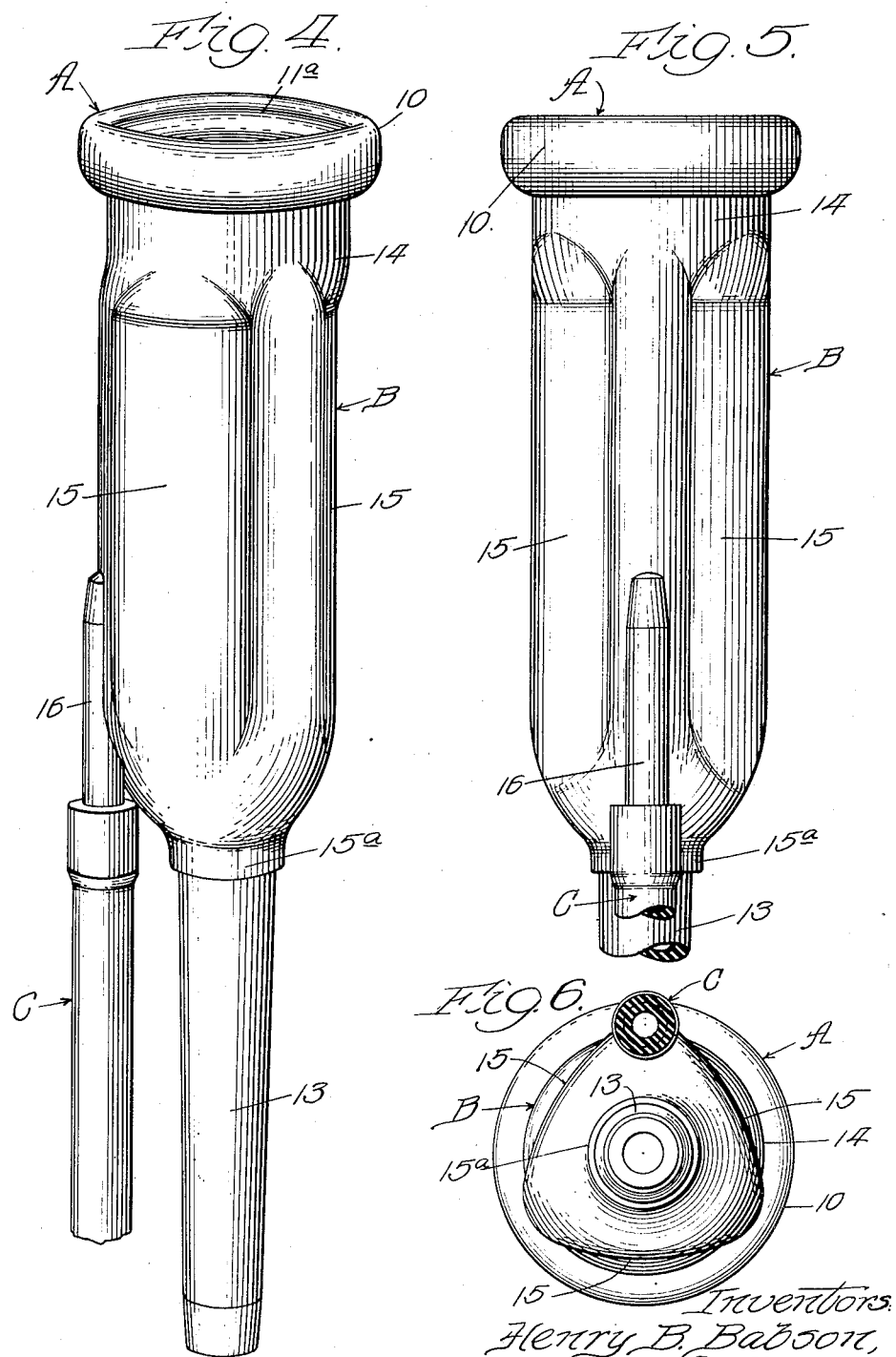

Patented Mar. 28, 1950

2,502,362

UNITED STATES PATENT OFFICE 2,502,362

MILKER INFLATION AND SHELL

Henry B. Babson, Chicago, and Chester A. Thomas, Crystal Lake, Ill., assignors to Babson Bros. Co., a corporation of Illinois Application June 18, 1945, Serial No. 600,010

9 Claims. (Cl. 31—85)

This invention relates to a milker inflation and shell, and more particularly to an improved teat cup assembly using an inflation having several improvements.

One feature of this invention is that it provides an improved inflation for milking machines, an inflation with a polygonal exterior configuration of its body portion, preferably triangular, providing a better distribution of pressure about the teat, resulting in closing of the teat canal with a minimum of strain on the tissues thereof, and improving the life of the inflation. Such an inflation is particularly adapted to use with a similarly polygonal shell to provide a teat cup assembly which requires a minimum of air movement for operation thereof, so that the desired pulsing action of the inflation is effected more quickly and with less power than heretofore.

Another feature of this invention is that the inflation has a main generally cylindrical body portion of substantial internal diameter and a reduced neck portion at least 20% less and preferably about 30% less than the internal diameter of the main body portion, the neck portion being of substantial axial length. The large internal diameter of the main body portion lets the vacuum get around the bottom of the teat and open it up better, while the reduced neck portion "hangs on" to the teat well, yet because of its substantial axial dimension or length does not irritate the skin of the teat or irritate or cause callouses in the canal connecting the teat to the udder.

Still another feature of this invention is that it provides an inflation particularly designed for use with a milker of the suspended type shown in McCornack U. S. Patent 1,859,213, for example. The upper portion of the inflation is provided with a rim portion having a socket receiving the top end of the shell; and the neck portion of the inflation comprises a wall extending directly inwardly and then downwardly from the rim portion, the downwardly extending portion of the wall being substantially spaced from any part of the rim or socket portion. The reduced neck portion tends to "hang on" to the base of the teat without moving, but flexing of the wall portion extending from the rim portion to the downwardly extending part of the neck portion is quite freely and readily effected by changes in vacuum conditions, so that the stem 13 has considerable "action," resulting in increased tugging and pulling on the teat by a suspended milker of the type mentioned.

Figure 2:
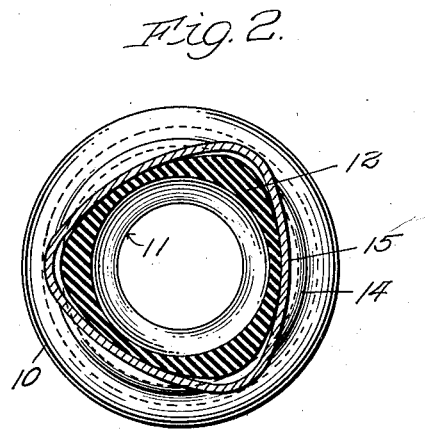
Figure 3:
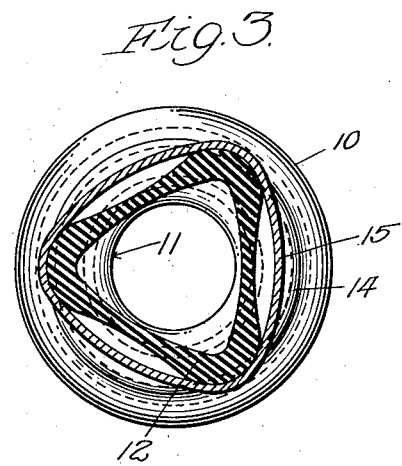

Other features and advantages of this invention will be apparent from the following specification and the drawings, in which:

Figure 1 is a vertical sectional view of a teat cup assembly embodying our inventions; Figure 2 is a transverse sectional view along the line 2—2 of Figure 1, with the inflation in unstressed condition; Figure 3 is a section similar to Figure 2 but showing the inflation walls moved in to a position in which they would close off the teat canal as a result of pressure differential between the interior and exterior of the inflation; Figure 4 is a perspective view of the teat cup assembly shown in Figure 1; Figure 5 is a fragmentary elevation looking from the left in Figure 1; and Figure 6 is a bottom view of the teat cup assembly.

In milking a cow by machine, vacuum is applied to the opening at the lower end of the teat to draw milk out of the teat and out of the cistern or reservoir immediately thereabove. In order to provide stimulation and to prevent injury to the teat and udder, it is desirable to massage or compress the teat and periodically to close off the flow of milk therethrough. This is accomplished in all present commercial milking machines by providing a flexible enclosing element for the teat, termed an inflation, with a suction and milk discharge tube connected to the milker bucket; and by enclosing the inflation in a rigid shell and alternately providing conditions of vacuum and of atmospheric pressure in the shell to the outside of the inflation. When substantially equal vacuums are applied both to the outside and the inside of the inflation, the inflation is then in what may be termed unstressed condition, and the vacuum present in the discharge tube acts upon the teat to withdraw milk therefrom and from the reservoir thereabove. On the other hand, when atmospheric pressure is present in the shell to the outside of the inflation, the pressure differential between the inside and the outside of the inflation may be in the neighborhood of five to eight pounds per square inch, resulting in the inflation squeezing inwardly sufficiently to shut off any flow of milk through the teat. This period of cessation of milk flow, which may be termed the "rest" period, permits the reservoir to refill from other portions of the udder connected to the reservoir by branching channels and ducts; and this "giving down" of the milk, as it is generally termed in the dairy industry, is encouraged by the stimulus caused by mechanical gripping and releasing of the teat.

These alternate conditions of operation are repeated at a rate generally in the neighborhood of forty to fifty cycles per minute, the provision of vacuum and atmospheric pressure conditions in the shell being effected automatically at this rate by a portion of the milking machine termed a pulsator. The principle of applying vacuum at all times to the end of the teat, and alternately squeezing and releasing the teat to permit intermittent flow of milk therethrough is termed "double action" milking, and has been the conventional commercial method of milking machine operation for about three decades. Inasmuch as this method of milking and machines for operating in this manner are so well known, they are not illustrated and described more fully here. If it is so desired, the present description, which will hereinafter be limited to the teat cup assembly and the improvements which we have made therein, may be supplemented by reference to McCornack Patent 1,859,213, which discloses a conventional commercial type of milking machine, and Fosler Patent 1,376,804, which shows the details of operation of a pulsator therefor.

In the particular embodiment of our invention illustrated herewith, one teat cup assembly (four identical assemblies of this type would be used with each machine, of course) is illustrated as comprising an inflation A, a shell B and a vacuum hose C. The inflation has a lower stem portion integral therewith operating as a milk tube, the inflation corresponding in its body and stem portion to the elements identified as 22 and 19 in the above-mentioned McCornack patent, in so far as the general principles and operation are concerned; and the shell and vacuum hose correspond generally to the elements identified as 18 and 21 in such patent. It will be understood that this correspondence is merely as to general shape and modes of operation, as the present teat cup assembly constitutes an improvement over those heretofore used in the manner claimed in the claims attached hereto.

The inflation A, which may be of flexible material such as natural or synthetic rubber, comprises an upper or rim portion here identified in general as 10, a neck portion identified as 11, a main body portion here identified as 12, and a stem portion here identified as 13, all of these portions preferably being integral, as illustrated. The lower end (speaking with respect to the position of the parts as shown in the drawing) of the stem portion would be slipped over a nipple on a lid of a milker of the kind shown in the above-mentioned McCornack patent, or onto a nipple of a claw, if the milking machine is of the so-called floor type. As vacuum is always drawn in the bucket during the milking operation, generally at 10 to 15 inches of mercury, vacuum always exists in the interior of the stem portion 13 and is applied to the lower end of the teat, which would lie in the body portion 12 of the inflation.

The shell, preferably of rigid material such as stainless steel, comprises an upper portion here identified as 14, a main body portion here identified as 15, and a connector nipple here identified as 16. The upper portion 14 of the shell is preferably circular in cross section, and is provided with a bead 14a adapted to be received in a recess 10a provided for such purpose in the rim portion 10 of the inflation. The lower end of the body portion 15 of the shell is considerably reduced in diameter to provide the necked in portion 15a, this portion being adapted snugly to encircle the upper end of the stem portion 13 of the inflation so that there is an air-tight seal at this point. The vacuum hose C is connected to the nipple 16 at one end, as shown, and to a nipple on the pulsator at the other end, so that vacuum and atmospheric pressure conditions alternately exist in this hose, and thus in the space between the shell and the inflation, at a rate determined by the rate of operation for which the pulsator is adjusted.

While the body portions of both the inflation and shell may be termed generally cylindrical and such portions each have a central opening or passageway of considerable length as compared with the diameter thereof, reference to Figures 2 to 6 will make it apparent that the cross sectional configurations of the shell, and of the exterior of the inflation, are not circular. We have found that it is preferable to have the inner wall of the inflation, in unstressed condition, circular as illustrated in Figure 2; but that improved results are obtained by making the exterior wall of the inflation in the shape of a regular polygon. While the exterior cross-sectional configuration of the body portion of the inflation is here shown as generally triangular, this being the preferred form, it will be understood that the advantages of our invention may also be achieved by the use of other generally polygonal shapes such as squares or pentagons. At least the inner wall of the shell 15 must be of a generally similar polygonal configuration in cross section, being here shown as generally triangular. While the exterior wall of the shell would not necessarily be of the same shape, it is preferable to start with a cylinder of sheet metal and form it to the polygonal shape desired, as illustrated in Figure 2. The altitudes of the interior surface of the generally triangularly shaped shell (when viewed in cross section), however, should be somewhat greater than the altitudes of the exterior surface of the inflation in unstressed condition (when viewed in cross section), so that space may exist between the apices of the inflation and the apices of the correspondingly polygonal shell, as illustrated in Figure 2, when approximately the same conditions of vacuum exist on the inside and outside of the inflation. In the construction shown this provides three vertical channels for movement of air, the nozzle 16 being connected to the shell at one of these channels and all of these channels being connected together at their upper ends by the annular space existing between the portion 14 of the shell and the spaced inner circular upper portion of the inflation. When atmospheric pressure is admitted to the shell through the hose C and nipple 16, this construction provides for the application of pressure to the entire outer wall area of the inflation with a minimum of air space requiring exhaustion on the next or vacuum portion of the pulsator cycle. Alternate squeezing and relaxing of the inflation with a minimum of air movement not only result in faster action but also in economizing of power in the creation of vacuum in the lines connected to the milker.

The body portions of the inflation and shell are preferably so proportioned that when the pressure conditions inside and outside of the inflation are substantially equal, so that the inflation is in substantially unstressed condition, the outer surfaces of the walls which may be termed the sides of the triangle, as viewed in Figure 2, contact the adjacent inner surfaces of the sides of the shell body portion. On the other hand, what may be termed the corner portion or apices should not come into contact with the inner corner of the shell when the inflation is in unstressed condition. A space should be left here which, in the normal teat cup assembly might be $\frac{1}{16}$ of an inch which has the dual function of providing for air movement while at the same time keeping the air space to a minimum, and also providing for outward movement of the corner portions when the inflation walls collapse. Referring more particularly to Figure 3, the inflation is shown in a position assumed when atmospheric pressure exists on the outside of the inflation and the inflation is substantially filled with a teat of normal size. The pressure differential causes the sides of the triangle to move inwardly sufficient to compress the teat and close off milk passage therethrough, the corner portions expanding out into the space in the apices of the shell body as the center of the sides move inwardly. In the position shown in Figure 3 the distance from the center of the inner surfaces of the sides to the axis of the assembly are much shorter than the radius in the position shown in Figure 2, so that there has been a definite inward compression of the teat. It will be understood, of course, that the sides move in a distance determined by the teat in the inflation, and if the teat is smaller the sides move in further. The pressure on the outside of the inflation is always sufficient to squeeze the teat walls to a point where the flow of milk therethrough is stopped, the limiting position of the movement of the sides of the body portion of the inflation being determined by the size of the teat and how thick its walls are.

As will be readily apparent from an examination of Figure 1, the internal diameter of the main body portion 12 of the inflation is substantially greater than the internal diameter of the coaxial neck portion 11. We have found that a large internal diameter of the body portion results in improved milk flow by letting the vacuum in the stem 13 get around the bottom of the teat and open it up better on the flow portion of the cycle of operation. However, we have found that retention of this same large internal diameter throughout the entire inflation is undesirable in that the inflation and shell do not "hang on" properly. Accordingly, we have provided a reduced neck portion which is substantially less in internal diameter but which has a substantial axial length, in order to avoid the irritating effect of narrow inwardly extending rims sometimes heretofore used on inflations. We have found that the internal diameter of the neck portion should be at least 20% less, and preferably about 30% less, than the internal diameter of the main body portion, as the base of a teat is generally slightly smaller than the portion therebelow, and it is desired to grip this portion fairly firmly to keep the shell and inflation in place. We have also found that, if irritation of the teat base and inner canal are to be avoided, the neck portion should have an axial dimension or length at least one-third and preferably one-half or more of its internal diameter. In a particular embodiment of our invention which we have made we have found that very satisfactory results may be achieved by using a body portion with an internal diameter of 1⅜ inches and a neck portion with an internal diameter of one inch and an axial dimension of slightly over a half inch, the cross sectional view of Figure 1 being a scale drawing of this particular preferred embodiment of our inflation.

We have also found that we can improve the milking efficiency of a suspended milker (of the kind shown in McCornack Patent 1,859,213, for example) by designing the upper portion of the inflation, and more particularly the neck portion and the way in which it joins the rim and socket portion. As may be seen by reference to Figure 1, the rim portion 10 of the inflation is provided with the socket or annular recess 10a adapted to receive the annular bead 14a at the top of the shell, the rim portion of the inflation having an outer depending portion 10b and an inner depending portion 10c. Rather than forming the neck integral with the inner depending flange 10c of the rim portion, we form the neck by a wall portion which extends directly inwardly (radially) for a distance equal to at least its own thickness, this portion being here identified as 11a; and then by having this wall portion extend downwardly in a straight cylindrical portion 11b for a half inch or slightly more, and then flare outwardly in the portion 11c to join the main body portion 12 of the inflation. By having a relatively thin wall portion (of only about ⅛ inch thickness, for example) extend directly inwardly at least ⅛ or 3/16 inch from the inner flange 10c of the rim portion 10, and then downwardly, a very flexible and relatively freely axially movable neck portion is provided. That is, the downwardly extending portion 11b which grips the base of the teat is capable of considerable movement axially with respect to the shell upon variation in vacuum conditions between the shell and inflation as a result of pulsator operation. Changes in the vacuum state cause a flexing of the whole inflation resulting in appreciable flexing of the inwardly extending wall portion 11a, so that the depending cylindrical portion 11b will have at least ⅛ inch and frequently even more axial movement with respect to the shell. When atmospheric pressure is admitted through the nipple 16 to the space between the shell and inflation, the neck portion of the inflation assumes the position illustrated in the drawing; while when the pulsator causes a vacuum to be drawn in this space, the cylindrical portion 11b moves downwardly with respect to the shell. This provides a considerable improvement in the downward and forward pull and tug automatically effected by a suspended milking machine of the type disclosed in the above-mentioned McCornack patent; and this increased tug and pull or greater "action," results in faster and more complete milking. The compression of the teat during that portion of the pulsator cycle when atmospheric pressure exists in the shell is such as to substantially cut off flow of blood, and during the other portion of the cycle blood must be permitted to get back from the teat into the udder veins in order to maintain enough circulation to prevent pain or injury to the teat. The relatively broad area of engagement of the neck, and the massaging effect of its very considerable axial movement, help to increase the flow of blood during the portion of cycle when vacuum exists between the shell and inflation.

The use of polygonal inflation and shell bodies (similarly polygonal, of course) provides a much improved inflation action which is more positive in shutting off the milk, easier on the teat in that the squeezing thereof is distributed more uniformly thereabout, and results in longer inflation life because of the better distribution of flexing stresses. In the old style inflation, for example, that portion of the inflation body below the teat (which might be a considerable portion where the teat was short) collapsed flat upon itself with frequent resulting splitting of the inflations if they had lost their resilience to the slightest extent for any reason. The present arrangement provides the maximum flexing stresses in the thickened corner or apex portions of the inflation, and even there distributes the stresses through three or more corners rather than two, obviating the abovementioned difficulty. This construction also appears to result in the inflation restoring itself to the position shown in Figure 2 more quickly after vacuum is again applied to the exterior thereof, resulting in quicker resumption of milk flow and faster milking.

The combination of a relatively narrow neck with a relatively wide body part gives all the advantages of a large inflation in letting the teat open up fully during the flow period of operation, while the use of the narrow neck of substantial axial length maintains the desired position of the inflation neck on the teat in a way which does not irritate either the outer skin or the inner canal of the teat.

The use of a relatively thin and flexible wall portion which extends directly inwardly from the rim portion and then downwardly to form the neck portion, with a space between the neck portion and any other adjacent portion of the inflation or shell, provides better tugging and pulling action of the milker and an improved massaging action letting the blood go back to the udder and keeping proper circulation through the teat.

The combination of all these features provides an inflation which constitutes a very considerable improvement in this field, all of these features cooperating with each other to achieve faster and more complete milking with less irritation to the teat, and with improved life of the inflation.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. A flexible inflation for use in a teat cup shell of a milker, including: an upper rim portion; a generally cylindrical body portion having a circular interior and a generally polygonal exterior configuration in cross-section, said configuration extending substantially throughout the length of the body portion; and a lower stem portion.

2. A flexible inflation for use in a teat cup shell of a milker, comprising a generally cylindrical body portion having a circular interior and a generally polygonal exterior configuration in cross-section, said configuration extending substantially throughout the length of the body portion.

3. A flexible inflation for use in a teat cup shell of a milker, comprising a hollow body portion of substantial depth having a circular interior and a generally triangular exterior configuration in cross-section, said configuration extending substantially throughout the depth of the body portion.

4. A teat cup assembly for use with a milker, including: a rigid shell having a body portion with a generally polygonal interior configuration in cross-section; and a flexible inflation having its body portion in said shell, the body portion of said inflation being generally cylindrical and having a circular interior and a generally polygonal exterior configuration in cross-section, said polygonal configurations being similar.

5. A teat cup assembly for use with a milker, including: a rigid shell having a body portion with a generally triangular interior configuration in cross-section; and a flexible inflation having its body portion in said shell, the body portion of said inflation having a circular interior and a generally triangular exterior configuration in cross-section.

6. A teat cup assembly for use with a milker, including: a rigid shell having a body portion with a generally triangular interior configuration in cross-section; and a flexible inflation having its body portion in said shell, the body portion of said inflation having a circular interior and a generally triangular exterior configuration in cross-section, the sides of said inflation lying closely adjacent the sides of the shell and the apices slightly spaced from the apices of the shell when the inflation is in unstressed condition.

7. A teat cup assembly for use with a milker, including: a rigid shell having a body portion with a generally polygonal interior configuration in cross-section; and a flexible inflation having its body portion in said shell, the body portion of said inflation having a circular interior and a generally polygonal exterior configuration in cross-section, said polygonal configurations being similar, the sides of said inflation lying closely adjacent the sides of the shell and the apices slightly spaced from the apices of the shell when the inflation is in unstressed condition.

8. A flexible inflation for use in a teat cup shell of a milker, including: an upper rim portion having a socket part adapted to receive the upper edge of the shell; a neck portion comprising a wall part extending inwardly and downwardly from said rim portion; and a generally cylindrical body portion having a circular interior and a generally polygonal exterior configuration in cross-section.

9. A teat cup assembly for use with a milker, including: a rigid shell having a body portion with a generally triangular interior configuration in cross-section; and a flexible inflation having upper rim and neck portions and a generally cylindrical body portion in said shell, the body portion of said inflation having a circular interior and a triangular exterior configuration in cross-section, the internal diameter of the neck portion being at least 20% less than that of the body portion of said inflation and the length of said neck being at least 10% of that of the body portion of said inflation.

HENRY B. BABSON.
CHESTER A. THOMAS.

REFERENCES CITED

The following references are of record in the file of this patent:

UNITED STATES PATENTS

| Number | Name | Date |
| --- | --- | --- |
| 948,608 | Hodge et al. | Feb. 8, 1910 |
| 1,167,968 | Anderson | Jan. 11, 1916 |
| 1,312,941 | Anderson | Aug. 12, 1919 |
| 1,322,311 | Koch et al. | Nov. 18, 1919 |
| 1,365,665 | Davies | Jan. 18, 1921 |
| 1,417,116 | Turk et al. | May 23, 1922 |
| 1,601,145 | Remy | Sept. 28, 1926 |
| 1,690,327 | Dineson | Nov. 6, 1928 |
| 1,839,765 | Knox | Jan. 5, 1932 |
| 1,896,321 | Maes | Feb. 7, 1933 |
| 2,340,295 | Bender | Feb. 1, 1944 |

FOREIGN PATENTS

| Number | Country | Date |
| --- | --- | --- |
| 101,945 | Great Britain | Nov. 2, 1916 |